(12) United States Patent
Kint

(10) Patent No.: US 8,540,304 B2
(45) Date of Patent: Sep. 24, 2013

(54) REAR AERODYNAMIC DEVICE FOR A VEHICLE AND VEHICLE EQUIPPED WITH SUCH A DEVICE

(75) Inventor: Laurent Kint, Saint Sorlin de Morestel (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 13/060,710

(22) PCT Filed: Sep. 4, 2008

(86) PCT No.: PCT/IB2008/003095
§ 371 (c)(1),
(2), (4) Date: Feb. 25, 2011

(87) PCT Pub. No.: WO2010/026442
PCT Pub. Date: Mar. 11, 2010

(65) Prior Publication Data
US 2011/0148142 A1    Jun. 23, 2011

(51) Int. Cl.
*B62D 35/00* (2006.01)
(52) U.S. Cl.
USPC ............... 296/180.1; 296/180.2; 296/180.4; 296/208
(58) Field of Classification Search
USPC ........ 296/180.1, 180.4, 208, 180.2; 180/903; 105/1.1, 1.2
See application file for complete search history.

(56) References Cited

U.S. PATENT DOCUMENTS

| | | | | |
|---|---|---|---|---|
| 2,242,494 A | * | 5/1941 | Wolf | 180/68.1 |
| 3,635,517 A | * | 1/1972 | Wilfert et al. | 296/208 |
| 4,343,506 A | * | 8/1982 | Saltzman | 296/24.31 |
| 4,690,204 A | * | 9/1987 | Reichel et al. | 165/44 |
| 4,838,603 A | * | 6/1989 | Masoero et al. | 296/180.1 |
| 6,260,911 B1 | * | 7/2001 | Becker | 296/180.2 |
| 6,685,256 B1 | | 2/2004 | Shermer | |

FOREIGN PATENT DOCUMENTS

| | | | |
|---|---|---|---|
| EP | 0279791 A | | 8/1988 |
| EP | 1060933 A | | 12/2000 |
| JP | 63-180575 | * | 7/1988 |
| WO | 03018340 A | | 3/2003 |

OTHER PUBLICATIONS

International Search Report for corresponding International Application PCT/IB2008/003095.

* cited by examiner

*Primary Examiner* — Dennis Pedder
(74) *Attorney, Agent, or Firm* — WRB-IP LLP

(57) ABSTRACT

A rear aerodynamic device for a vehicle and vehicle equipped with such a device are provided. The aerodynamic device can be fastened under a rear end of a vehicle frame of a cargo body of an industrial vehicle, behind the wheels. It includes a nozzle having an inlet positioned on a lateral external face of the device and capable of canalising air flowing along the vehicle and an outlet positioned at the rear part of the device and capable of ejecting the air flow underneath a vehicle rear face.

17 Claims, 4 Drawing Sheets

REAR AERODYNAMIC DEVICE FOR A VEHICLE AND VEHICLE EQUIPPED WITH SUCH A DEVICE

BACKGROUND AND SUMMARY

The present invention relates to an automotive vehicle, especially an industrial vehicle. More specifically, the invention concerns a rear aerodynamic device for a vehicle and a vehicle equipped with such a device.

For many years, attempts have been made to improve vehicle efficiency. One factor in an efficient design is the aerodynamic characteristics of a vehicle. The air drag of a vehicle and especially of an industrial vehicle such as a truck is one of the factors that has a direct impact on fuel consumption. Therefore, in a general trend towards rare and expensive energy—whether fossil or not—, aerodynamics is one of the key issue in an efficient vehicle.

One problem with the current industrial vehicles is that air passing longitudinally rearward along the side walls of the vehicle tends to deviate outward behind the vehicle rear wall. Such an air path is riot favourable because it causes turbulence and, moreover, contributes to the creation of a low pressure area behind the vehicle. This makes the drag coefficient of the vehicle high, which, consequently, generates a high fuel consumption.

Several devices have been added to vehicles in order to reduce turbulence, to prevent air from deviating away from the vehicle walls and/or to bring air into the rear low pressure area. However, these devices don't make it possible to efficiently canalize air, and they may create turbulence in other locations. Moreover, many of these known devices cannot be properly integrated into the general structure of the vehicle.

It therefore appears that, from several standpoints, there is room for improvement in industrial vehicles aerodynamics.

It is desirable to provide an improved vehicle, which can overcome the drawbacks encountered in conventional vehicle.

It is also desirable to provide a vehicle with a lower aerodynamic drag.

According to an aspect of the invention an aerodynamic device is provided that is suitable to be located under a rear end of a cargo body of an industrial vehicle, said device comprising a nozzle having an inlet positioned on a lateral external face of the device and capable of canalising air flowing along the vehicle and an outlet positioned at the rear part of the device and capable of ejecting the air flow underneath a vehicle rear face.

Consequently, when the device is fastened under a vehicle and when this vehicle is in motion, the air flowing in parallel with the vehicle side wall, along the wheels, is canalized through the nozzle and discharged behind the vehicle rear wall. This has two main advantages. First of all, turbulence is considerably lessened, because the nozzle ensures that the air flow has a steady direction. Moreover, due to the air discharged behind the vehicle rear wall, the pressure in the area located just behind the vehicle is increased. These two technical effects resulting from the nozzle contribute to efficiently decrease the aerodynamic drag of the vehicle and, as a consequence, to decrease the fuel consumption. One of the specific problems of industrial vehicles is their substantially parallelepiped shape. To maximise the vehicle cargo it is not possible to depart from an angular shape which is however not desirable in terms of aerodynamics. The invention has a positive impact on the aerodynamic drag insofar as the invention makes it possible to channel a flow of air towards the vehicle rear wall which is inherently a source of turbulence. The air flow that is ejected under the vehicle rear wall helps decreasing the aerodynamic drag.

The device according to an aspect of the invention ensures that the air flow is properly canalized from the vehicle side towards the vehicle back, i.e. from the nozzle inlet towards the nozzle outlet and, moreover, that this air flow does not undergo multiple and/or sudden direction changes. Therefore, said device proves to be very effective and to considerably improves the vehicle aerodynamics.

It has to be noted that the device is described in its position when fastened under a vehicle frame, the terms "side", "front", "rear", "upper", "lower", "inner", "outer", etc. being used to designate parts of the device in said position.

Preferably, the nozzle inlet is located in the vicinity of the nozzle outlet, so that said device can be secured onto the vehicle frame rearward from an axle of said vehicle.

This makes it possible to fit the aerodynamic device according to the invention on existing vehicles.

According to a preferred implementation of the invention, the nozzle cross section increases from the inlet towards the outlet, which contributes to increase the pressure behind the vehicle.

At least one among an inner wall and an outer wall of the nozzle may be convergent inwardly rearward. This shape generates an air flow which reduces the device and the vehicle wake, i.e. which reduces the zone of turbulence. Preferably both inner wall and outer wall are convergent, with the outer wall being less convergent, so that the nozzle cross section increases from the inlet towards the outlet. Preferably as well, the inner wall and/or the outer wall of the nozzle can be curved, in order to enhance the air guiding Besides, for the same reason, at least one among a lower wall and an upper wall of the nozzle may be convergent upwardly rearward. For example, the nozzle upper wall can be substantially horizontal, so that the device can be more easily fastened under the vehicle frame, and the nozzle lower wall can be convergent. Preferably, at least the lower wall is properly curved to enhance the air guiding.

Therefore, in an advantageous way, the nozzle and the device can be streamlined as a boat tail, which considerably improves the aerodynamics.

According to an embodiment of the invention, the device further comprises a ridge extending under the nozzle at the lower part of the device, said ridge extending roughly longitudinally and its external side wall converging inwardly rearward, whereby said ridge can canalize the residual air that did not enter the nozzle, and direct it rearward and inwardly. This important arrangement ensures that, when the device is fastened under the vehicle, the residual air flow is directed towards the vertical longitudinal plane of symmetry of the vehicle. Said ridge performs the functions of collecting the air not moving inside the nozzle, and to guide it in an appropriate direction in order to minimize turbulence.

Said ridge may have an internal side wall diverging outwardly rearward.

In an advantageous way, the device has a lower surface which is convergent upwardly rearward, this shape being favourable for the air flow since it reduces the wake.

It can be envisaged that the device form a substantially parallelepiped block having a vertical longitudinal plane of symmetry, said device comprising only two nozzles each located near a side of the block. Said device can thus extend over the entire width of the vehicle frame, so as to canalize air flowing along both sides of the vehicle.

There may be provided on the device two ridges defining a central diverging passageway below the device, when each ridge has an internal side wall diverging outwardly rearward. This contributes to increase the pressure behind the vehicle, because the air speed decreases in the diverging passageway.

The central passageway may further comprise substantially longitudinally extending fins projecting downwards, thereby helping the air flow guiding.

The invention also concerns a vehicle such as a trailer, a semi-trailer or a straight truck comprising a frame supported by wheels and a cargo body, which further comprises an aerodynamic device as previously described, said device being located under a rear end of the cargo body, rearward from the wheels. With this arrangement, the invention makes it possible to improve the vehicle aerodynamics without requiring a device which takes up a large area and/or volume under the vehicle.

Preferably, the vehicle comprises a side panel fastened to the frame, along and outside the wheels, said panel being arranged to form a substantially continuous and smooth surface with the nozzle inner wall. This fairing contributes to efficiently guide air in order to further decrease turbulence and improve aerodynamics.

According to an embodiment of the invention, the vehicle can further comprise an underride guard extending in the transverse direction; the said underride guard (30) is integrated in said aerodynamic device (10), under the nozzles (15).

It therefore appears that the device of the invention can improve the vehicle aerodynamics without hampering the implementation of other conventional elements of the vehicle, such as security organs. Furthermore, such organs can fit corresponding arrangements of the aerodynamic device according to the invention, which is very convenient and makes the assembly of the vehicle easier and faster.

According to an embodiment of the invention, the vehicle can also comprise at least one wing extending from a rear edge of the cargo body and substantially located in a plane converging towards the median longitudinal axis of the vehicle. Preferably, the vehicle is provided with four wings extending each from a rear edge of the cargo body. This or these wings form behind the vehicle a shape that reduces the wake.

It can be envisaged that the vehicle comprise at least one side wing extending from a vertical rear edge of the cargo body, said wing extending downwards substantially as far as the nozzle lower wall, in the prolongation of the nozzle outer wall. This improves the air guiding by preventing the air flow to deviate outwardly downstream the nozzle outlet.

These and other advantages will become apparent upon reading the following description in view of the drawing attached hereto representing, as non-limiting examples, embodiments of a vehicle according to the invention.

BRIEF DESCRIPTION OF THE DRAWING

The following detailed description of several embodiments of the invention is better understood when read in conjunction with the appended drawings being understood, however, that the invention is not limited to the specific embodiments disclosed. In the drawing.

DETAILED DESCRIPTION

Figure 1:
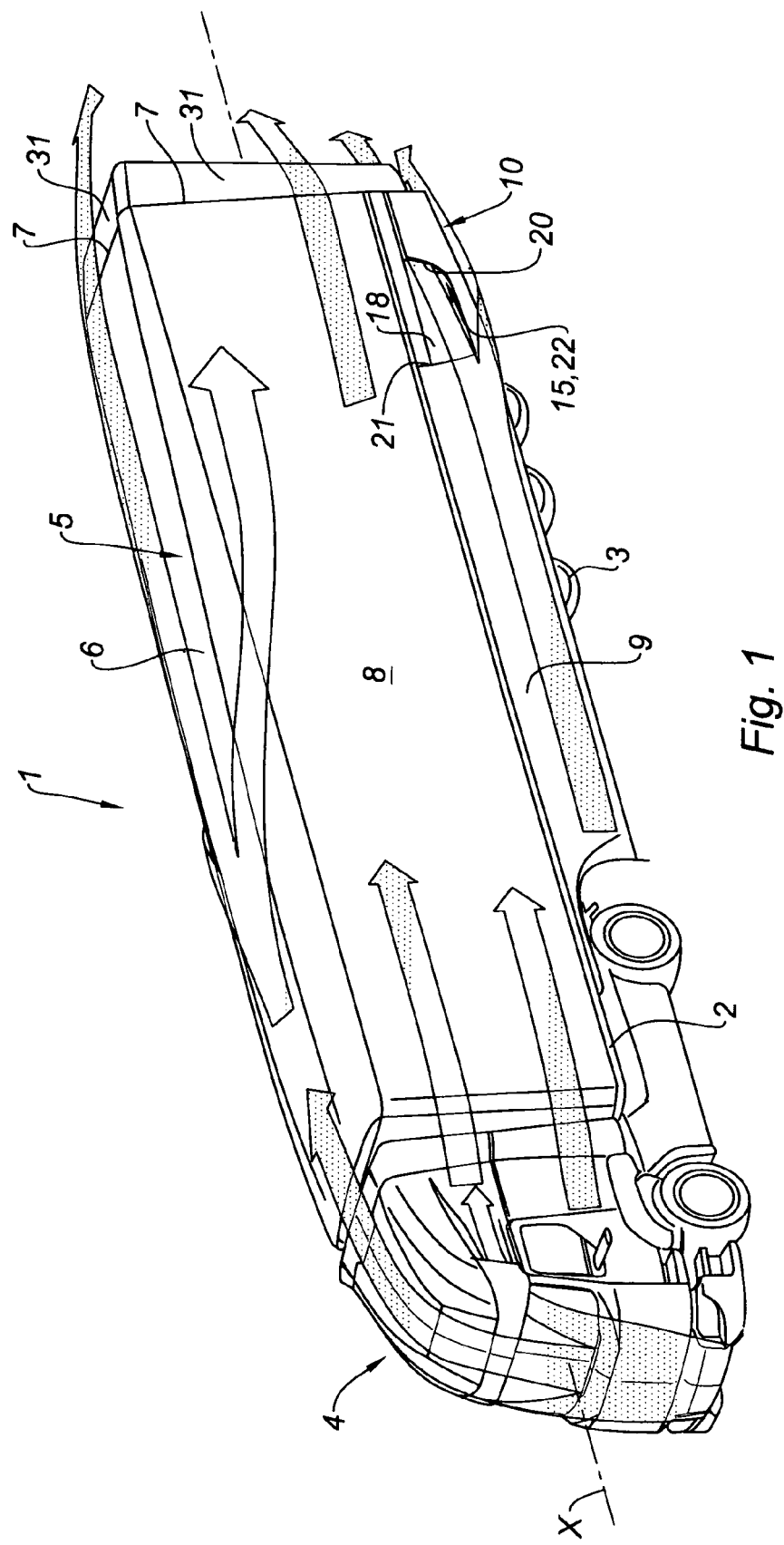
FIG. 1 is a perspective view of a vehicle comprising a device according to the invention.
Figure 2:
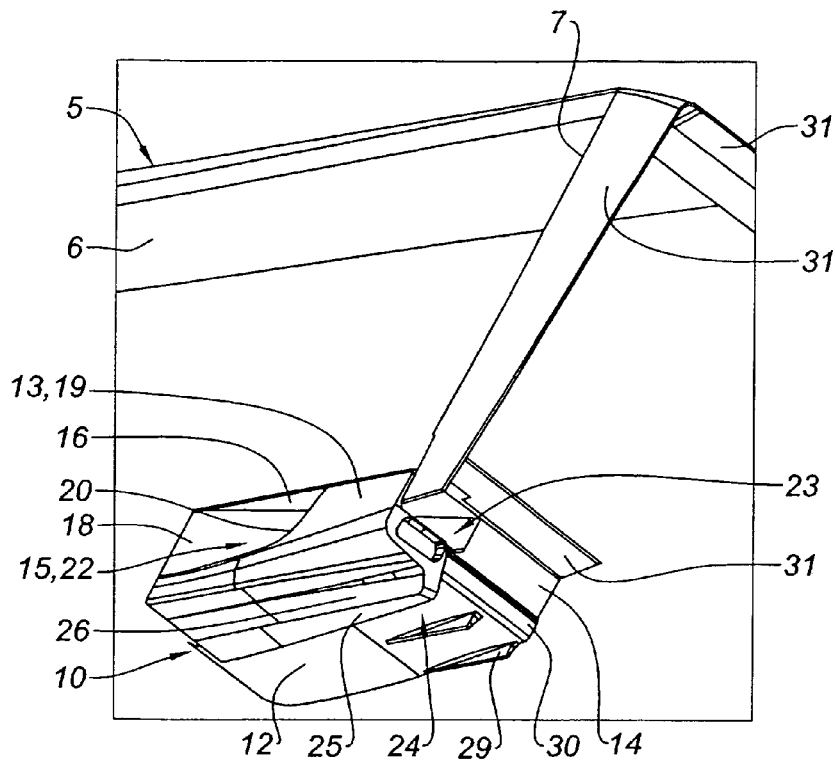
FIG. 2 is a partial perspective rear bottom view of said vehicle, the side walls, frame and wheels of the vehicle not being illustrated.
Figure 3:
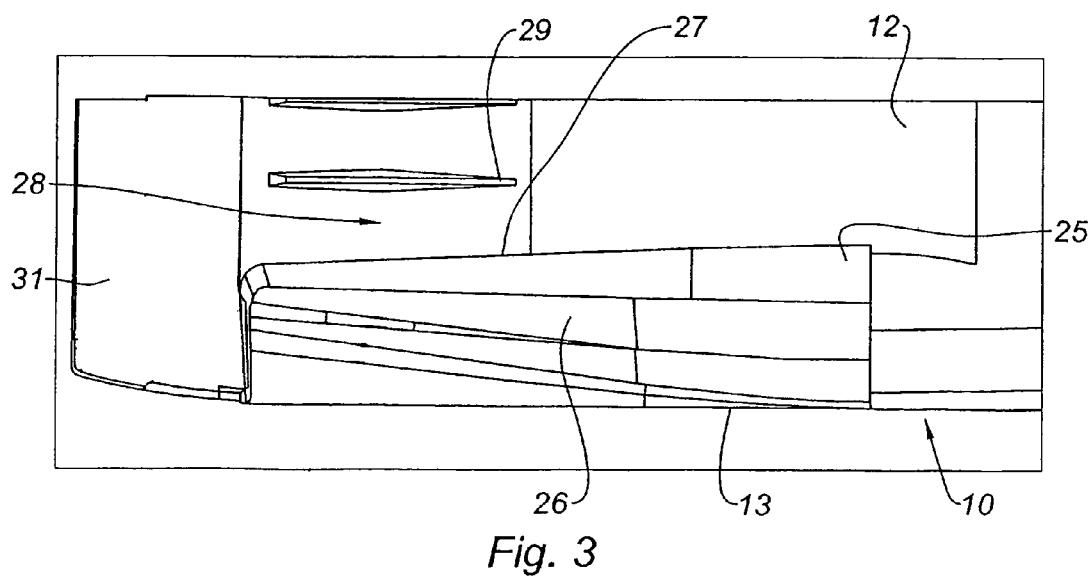
FIG. 3 is a partial bottom view of said device and said vehicle.
Figure 4:
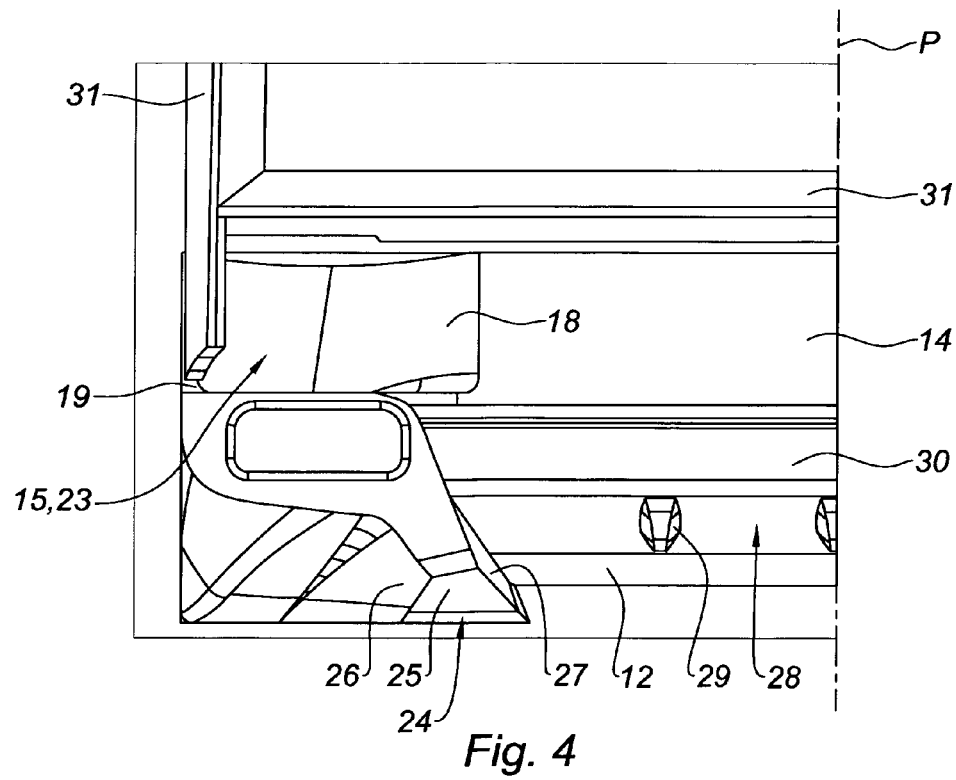
FIG. 4 is a partial rear view of said device and said vehicle.
Figure 5:
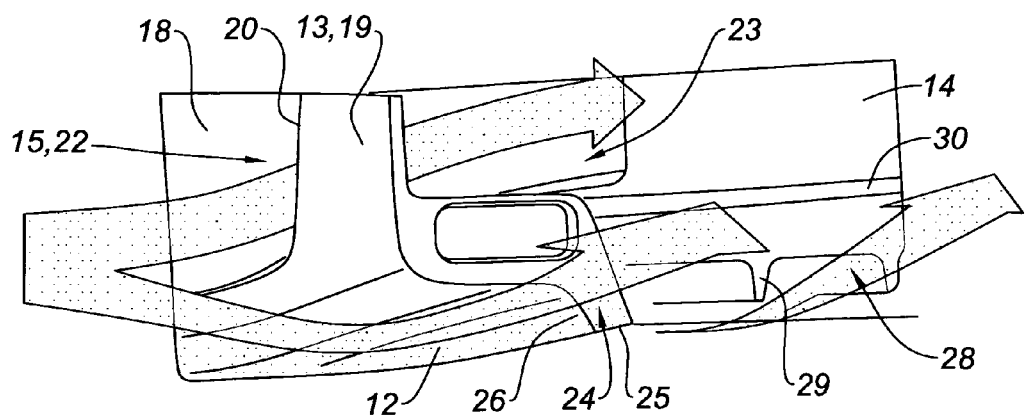
FIGS. 5 to 7 are simplified views of the device showing the air flows, respectively a rear external side view, a front side view, and a rear internal side view.
Figure 6:
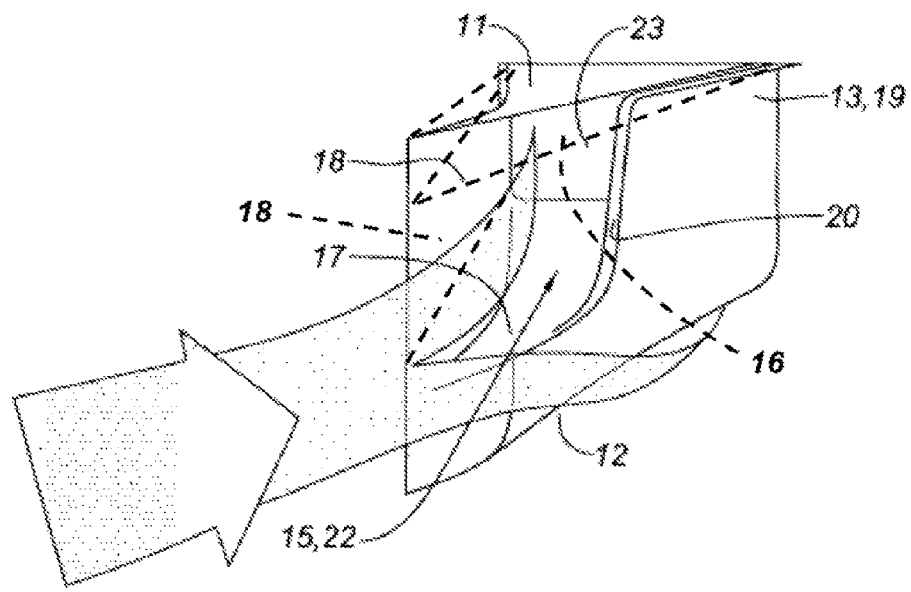
Figure 7:
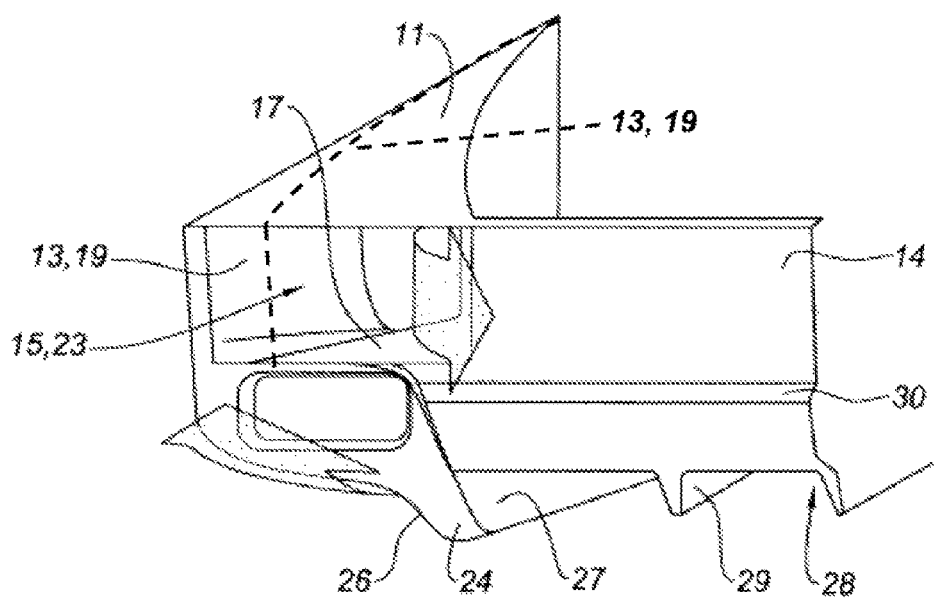

As this is illustrated in FIG. 1, a vehicle 1 comprises a frame 2 supported by wheels 3 as well as a cab 4 and a cargo body 5 supported on the frame 2. In this embodiment, the vehicle is a semi-trailer, but the invention also concerns trailers or straight trucks (i.e. a vehicle with the cargo body and the tractor mounted on the same frame).

The cargo body 5 has an upper wall 6, rear edges 7 substantially forming a rectangle, and two side walls 8. The cargo body 5 also comprises, on each side, a side panel 9 fastened to the frame 2, along and outside the wheels 3.

The vehicle 1 comprises an aerodynamic device 10 which is roughly shaped as a parallelepiped block and is fastened under the vehicle frame 2, close to the rear edge of the cargo body 5, behind the wheels 3. Said device 10 has substantially the same width as the cargo body 5, and therefore extends from one side wall 8 to the other. The device 10 has a vertical longitudinal plane of symmetry P, as vehicle 1 (see FIG. 4). Only a lateral half of the device is illustrated in FIGS. 2-7.

The aerodynamic device 10 has a substantially flat and horizontal upper surface 11, in order to be easily fastened under the vehicle frame 2, a lower surface 12 which is almost flat, at least in its central portion, while also slightly curved upwardly rearward; and side walls 13 which are substantially flush with the side walls 8 of the cargo body 5. Thus, the aerodynamic device 10 forms an envelope which is profiled as a boat tail, this shape at the rear part of the vehicle being favourable in so far as it reduces the wake and avoids turbulence. The device 10 also has a substantially flat rear face 14 which can be flush with the rear face of the cargo body 5.

In the aerodynamic device 10 are provided two nozzles 15, each located near and along a side of said device 10, and extending roughly longitudinally. Said nozzles 15 are designed to appropriately canalize rearward at least part of the air moving along the vehicle side walls 8 and side panels 9 when the vehicle is in motion. Therefore, no central nozzle is required.

A nozzle 15 has an upper wall 16 which may be identical to the upper surface 11 of device 10, a lower wall 17, an inner wall 18 and an outer wall 19 which may be identical to the corresponding side wall of device 10. Said nozzle walls define a peripherally closed passageway. In the illustrated embodiment, the inner wall 18 is curved and convergent inwardly rearward, and the lower wall 17 is also curved and converges upwardly rearward. Thus, the inside passageway is shaped to efficiently direct air and to avoid the generation of turbulence. Preferably the outer wall 19 is flush with the side walls 8 of the cargo body 5 and is also flush with the side panel 9 so that the aerodynamic device 10 does not create any detrimental projection.

The nozzle inner wall 18 extends forward as far as a rear edge 21 of side panel 9, forming with said side panel 9 a substantially continuous and smooth surface inclined inwardly when one goes rearward. On the contrary, the nozzle outer wall 19 has a front edge 20 spaced rearward from the rear edge 21 of side panel 9. As a consequence, a nozzle inlet 22 is formed in the side wall 13 of device 10. Besides, the nozzle 15 has an outlet 23 formed in the rear face 14 of device 10.

The nozzle cross section increases from the inlet 22 towards the outlet 23, so that the speed of air moving rearward into said nozzle 15 decreases.

The device 10 also comprises two ridges 24. Each ridge 24 projects downwards from the device lower surface 12, under the corresponding nozzle 15, and extends roughly longitudinally as far as the device rear face 14.

The ridge 24 has a lower surface 25 which deviates downward when one goes rearward: near the front surface of device 10, the lower surface 25 is substantially identical to the lower surface 12 of device 10, and the height of ridge 24 progressively increases until the device rear face 14. The ridge 24 also has an external side wall 26 which converges inwardly rearward and an internal side wall 27 which diverges outwardly rearward.

A central diverging passageway 28 is therefore defined between the two ridges 24, below the device 10. Preferably, this central passageway 28 comprises substantially longitudinally extending fins 29 projecting downwards from the device lower surface 12.

The device 10 may also be provided with a recess extending in the transverse direction and able to receive the vehicle underride guard 30 which is designed to avoid that a vehicle crashing into the cargo body 5 moves under said cargo body. In the illustrated embodiment, said underride guard 30 is located under the nozzles 15 and extends from one ridge 24 to the other.

Finally, the vehicle 1 comprises four wings 31, each wing 31 extending from a rear edge 7 of the cargo body 5 and being substantially located in a plane converging towards the median longitudinal axis X of the vehicle 1 (see FIG. 1). As a result, behind the rear wall of the vehicle 1, there is formed a converging truncated pyramid. This shape improves the aerodynamics of the vehicle back by making air converge towards axis X and reducing turbulence.

Of course, such wings 31 are designed to make the opening of the vehicle rear door possible; for example the wings 31 can be hinged upon the cargo body 5. Preferably, the wings 31 extend longitudinally rearward over about 60-80 cm, for example about 70 cm.

Furthermore, the side wings 31 that extend each from a vertical rear edge 7 of the cargo body 5 extend downwards substantially as far as the nozzle lower wall 17, in the prolongation of the nozzle outer wall 19. With this arrangement, air is still guided after it has gone out of the nozzle 15.

When the vehicle 1 is in motion, air passing along the upper wall 6 of the cargo body 5 and along the side walls 8, above the wheels 3, is deviated rearward towards axis X thanks to the wings 31, thereby reducing the vehicle wake.

Besides, air passing along the side panel 9 is mostly forced to enter the corresponding nozzle 15, on each side of the cargo body 5, the flows being substantially symmetrical with respect to plane P. The air flow follows the continuous and smooth surface formed by the side panel 9 and then the nozzle inner wall 18. This air is canalized in the nozzle 15 and deviated without sudden direction changes, thanks to the curved and appropriately oriented walls of said nozzle 15. Thus, the air is discharged rearward with an adequate and stable direction, which avoids the generation of turbulence.

Furthermore, because of the increasing cross section of nozzle 15, the air flow speed decreases from the inlet 22 towards the outlet 23. As a consequence, this air flow goes out of the nozzle outlet 23, behind the vehicle 1, it helps increase the pressure in the rear low pressure area, which considerably improves aerodynamics.

The residual lateral air flow that did not enter the nozzle 15 tends to rotate and to follow the lower surface 12 of device 10, where it is canalized by ridge 24 and directed rearward and inwardly.

Finally, air passing under the vehicle 1 and under the device 10 flows between guiding ridges 24, in the central passageway 28, the fins 29 helping to properly direct the flow. The path of this air flow is distinct from the path of the residual lateral air flow, ridge 24 acting as a separating member. Thanks to this arrangement, the invention makes it possible:

to create a side flow converging as a boat tail, which reduces wake (this being helped by the side wing 31 located in the prolongation of the nozzle outer wall 19), to create a separate diverging and rising lower flow, which also reduces wake and at the same time helps increase the pressure behind the vehicle 1 and to prevent these flows from interfering, which would generate turbulence and would be prejudicial to the efficiency of the device according to the invention.

Of course, the invention is not restricted to the embodiment described above by way of non-limiting example, but on the contrary it encompasses all embodiments thereof.

The invention claimed is:

1. An aerodynamic device at least partially located under a rear end of a cargo body of an industrial vehicle, wherein the device comprises at least one nozzle having an inlet arranged along a side wall of the cargo body for receiving air flowing along the vehicle and an outlet at the rear end for ejecting air underneath a vehicle rear face, an inside of the nozzle comprising at least a lower wall, an upper wall, an inner wall, and an outer wall, wherein from the inlet toward the outlet, the lower wall converges upwardly such that a height between the lower wall and the upper wall decreases and such that an outlet distance between the lower wall and the upper wall at the outlet is less than an inlet distance between the lower wall and the upper wall at the inlet, and the inner wall diverges from the outer wall such that a cross-section of the nozzle at the outlet is greater than the cross-section of the nozzle at the inlet.

2. The device according to claim 1, wherein the nozzle inlet is located in the vicinity of the nozzle outlet, so that the device can be located on the vehicle frame rearward from an axle of the vehicle.

3. An aerodynamic device suitable to be located under a rear end of a cargo body of an industrial vehicle, wherein the device comprises a nozzle having an inlet positioned on a lateral external face of the device and capable of canalizing air flowing along the vehicle and an outlet positioned at the rear part of the device and capable of ejecting the air flow underneath a vehicle rear face, wherein it further comprises a ridge extending under the nozzle at the lower part of the device, the ridge extending roughly longitudinally and an external side wall thereof converging inwardly rearward, whereby the ridge is arranged to canalize residual air that did not enter the nozzle, and direct it rearward and inwardly.

4. The device according to claim 3, wherein the ridge has an internal side wall diverging outwardly rearward.

5. The device according to claim 1, comprising a lower surface which converges upwardly rearward.

6. An aerodynamic device suitable to be located under a rear end of a cargo body of an industrial vehicle, wherein the device comprises at least one nozzle having an inlet formed in a side wall of the device that is adapted to be arranged substantially flush with a side wall of the cargo body and the nozzle is capable of canalizing air flowing along the vehicle and an outlet positioned at the rear part of the device and capable of ejecting the air flow underneath a vehicle rear face, wherein the device forms a substantially parallelepiped block having a vertical longitudinal plane of symmetry, the at least one nozzle comprising only two nozzles, each nozzle of the two nozzles being located near a side of the block.

7. An aerodynamic device suitable to be located under a rear end of a cargo body of an industrial vehicle, wherein the device comprises at least one nozzle having an inlet formed in a side wall of the device that is adapted to be arranged substantially flush with a side wall of the cargo body and the nozzle is capable of canalizing air flowing along the vehicle and an outlet positioned at the rear part of the device and capable of ejecting the air flow underneath a vehicle rear face, and a ridge extending under the at least one nozzle at the lower part of the device, the ridge extending roughly longitudinally and an external side wall thereof converging inwardly rearward, whereby the ridge is arranged to canalize residual air that did not enter the at least one nozzle, and direct it rearward and inwardly, wherein the device forms a substantially parallelepiped block having a vertical longitudinal plane of symmetry, the at least one nozzle comprising only two nozzles, each nozzle of the two nozzles being located near a side of the block, and wherein two ridges define a central diverging passageway below the device.

8. The device according to claim 7, wherein the central passageway comprises substantially longitudinally extending fins projecting downwards.

9. A vehicle comprising a frame supported by wheels and a cargo body, wherein the vehicle comprises an aerodynamic device, the device being located under a rear end of the cargo body, rearward from rear wheels of the wheels, the aerodynamic device comprising at least one nozzle having an inlet formed in a side wall of the device, wherein the side wall is adapted to be arranged substantially flush with a side wall of the cargo body and the nozzle is capable of canalizing air flowing along the vehicle and an outlet at the rear end of the nozzle for ejecting air underneath a vehicle rear face, an inside of the nozzle comprising at least a lower wall, an upper wall, an inner wall, an an outer wall, wherein, in a direction from the inlet to the outlet, the inner wall diverges from the outer wall such that a cross-section of the nozzle at the outlet is greater than the cross-section of the nozzle at the inlet.

10. The vehicle according to claim 9, wherein the vehicle comprises a side panel fastened to the frame, along and outside the wheels, the panel being arranged to form a substantially continuous and smooth surface with the nozzle inner wall.

11. The vehicle according to claim 9, wherein the vehicle further comprises an underride guard extending in a transverse direction relative to a longitudinal direction of the vehicle, the underride guard being integrated in the aerodynamic device, under the nozzle.

12. The vehicle according to claim 9, comprises at least one wing extending from a rear edge of the cargo body and substantially located in a plane converging towards a median longitudinal axis of the vehicle.

13. The vehicle according to claim 12, comprising at least one side wing extending from a vertical rear edge of the cargo body, the wing extending downwards substantially as far as a nozzle lower wall, in the prolongation of a nozzle outer wall.

14. The device according to claim 1, wherein, in a direction from the inlet toward the outlet of the nozzle, the outer wall curves toward the inner wall.

15. The device according to claim 1, wherein, in a direction from the inlet toward the outlet of the nozzle, the upper wall converges upwardly.

16. The device according to claim 1, wherein the upper wall is substantially horizontal.

17. A vehicle comprising:
a body having a longitudinal centerline, a side wall and a rear end; and
an aerodynamic device comprising at least one nozzle disposed at a non-zero distance from a vertical plane through the longitudinal centerline and having an inlet arranged along the side wall of the body for receiving air flowing along the vehicle and an outlet at the rear end for ejecting air underneath a vehicle rear face an inside of the nozzle comprising at least a lower wall, an upper wall, an inner wall, and an outer wall, the inner wall being, relative to the vertical plane, straight or curved toward the vertical plane, in a direction from the inlet to the outlet, wherein from the inlet toward the outlet, the lower wall converges upwardly such that a height between the lower wall and the upper wall decreases and such that an outlet distance between the lower wall and the upper wall at the outlet is less than an inlet distance between the lower wall and the upper wall at the inlet, and the inner wall diverges from the outer wall such that a cross-section of the nozzle increases from the inlet toward the outlet, and the cross-section of the nozzle at the outlet is greater than the cross-section of the nozzle at the inlet.

* * * * *